US005948534A

United States Patent [19]

Altavilla

[11] Patent Number: 5,948,534

[45] Date of Patent: Sep. 7, 1999

[54] COATED PAPER STOCKS FOR USE IN ELECTROSTATIC IMAGING APPLICATIONS

[75] Inventor: Alex P. Altavilla, Vestal, N.Y.

[73] Assignee: Kodak Polychrome Graphics LLC, Norwalk, Conn.

[21] Appl. No.: 08/804,681

[22] Filed: Feb. 25, 1997

Related U.S. Application Data

[60] Provisional application No. 60/012,297, Feb. 26, 1996.

[51] Int. Cl.[6] .............................. B32B 29/00; D21H 19/00

[52] U.S. Cl. .............................. 428/423.7; 428/424.2; 428/475.2; 428/476.2; 428/476.6; 428/476.9; 428/481; 428/483; 428/507; 428/518; 428/537.5; 162/137; 162/138; 162/146; 162/157.3

[58] Field of Search .............................. 430/32, 48, 49; 162/137, 136, 138, 146, 157.3, 157.4, 157.7, 157.6; 427/411; 428/423.7, 424.2, 475.2, 476.2, 476.6, 476.9, 481, 483, 507, 518, 537.5

[56] References Cited

U.S. PATENT DOCUMENTS

| | | | |
|---|---|---|---|
| 3,811,913 | 5/1974 | Kasugai et al. | 117/34 |
| 3,914,522 | 10/1975 | Säverin et al. | 427/419.5 |
| 4,188,220 | 2/1980 | Kasugai et al. | 430/536 |
| 4,198,475 | 4/1980 | Yoneyama et al. | 430/223 |
| 4,259,422 | 3/1981 | Davidson et al. | 430/17 |
| 4,312,937 | 1/1982 | Kasper et al. | 430/496 |
| 4,375,486 | 3/1983 | Clough | 427/419.5 |
| 4,547,445 | 10/1985 | Asahina et al. | 430/22 |
| 4,562,140 | 12/1985 | Kohmura et al. | 430/230 |
| 4,705,746 | 11/1987 | Tamagawa et al. | 430/538 |
| 5,055,320 | 10/1991 | Miura et al. | 427/40 |
| 5,075,196 | 12/1991 | Daems et al. | 430/202 |
| 5,082,724 | 1/1992 | Katsura et al. | 428/303 |
| 5,102,737 | 4/1992 | Josephy et al. | 428/411.1 |
| 5,104,721 | 4/1992 | Sun | 428/206 |
| 5,141,599 | 8/1992 | Jahn et al. | 162/137 |
| 5,158,853 | 10/1992 | Sasaki et al. | 427/411 |
| 5,182,161 | 1/1993 | Noda et al. | 428/195 |
| 5,284,714 | 2/1994 | Anderson et al. | 427/419.2 |
| 5,393,560 | 2/1995 | Okada et al. | 427/411 |
| 5,693,370 | 12/1997 | Van den Zegel | 427/160 |

FOREIGN PATENT DOCUMENTS

| | | |
|---|---|---|
| 50-19402 | 6/1973 | Japan . |
| 50-61154 | 9/1973 | Japan . |
| 50-66519 | 10/1974 | Japan . |
| 60-64306 | 4/1985 | Japan . |
| 61-84643 | 4/1986 | Japan . |
| 1-137252 | 5/1989 | Japan . |
| 2-849 | 1/1990 | Japan . |

OTHER PUBLICATIONS

*Research Disclosure,* pp. 529–530 (Sep. 1994).

*Primary Examiner*—Diana Dudash
*Attorney, Agent, or Firm*—Ostrager Chong Flaherty & Onofrio

[57] ABSTRACT

Coated paper stocks for electrostatic imaging comprising a substrate coated on at least one surface with a resin layer comprised of olefinic material and a pin-hole free, continuous coating layer over said resin layer. The continuous layer has a glass transition temperature above 100° C. and is comprised of one or more natural or synthetic film forming polymers. As a single layer this continuous coating layer functions as both a heat protective and imaging layer. In an alternate embodiment two separate coating layers are provided with separate heat protective and imaging functionalities.

27 Claims, 1 Drawing Sheet

COATED PAPER STOCKS FOR USE IN ELECTROSTATIC IMAGING APPLICATIONS

This application claims the benefit of U.S. provisional application no. 60/012,297 filed Feb. 26, 1996.

FIELD OF INVENTION

This invention generally relates to coated paper stocks for use in electrostatic imaging applications including electronic imaging to provide color or black and white prints/copies having a photorealistic quality. More particularly, it concerns resin coated paper stocks with a coating layer having a Tg above 100° C. comprised of one or more natural or synthetic film forming polymers.

BACKGROUND ART

Over the years electrostatic and laser color copy/printers have shown significant improvement in their ability to make copies or prints giving excellent color rendition and image quality. The new generation of copiers and printers are now able to produce prints having quality comparable to that of silver halide color systems. With the advent of this ability the industry has attempted but has failed to produce, through electrostatic processes, images that have the look and feel of silver halide prints.

Plain paper is typically used in electrostatic printing applications which does not generally provide a high degree of resolution, especially when color is involved. In photographic applications resin coated papers are used to provide the necessary resolution and quality. However, use of resin coated paper, i.e. polyethylene resin, as a copy or printing media in electrostatic printing applications has been a problem. Typical fuser roll temperatures are between 125 to 225° C. Due to the low Tg of the resin the polyethylene softens or melts when coming into contact with the toner fuser roller of the copier/printer. This softening or melting causes paper jams and image degradation.

In addition to the "melt problem", electrostatic imaging directly on a resin coated paper substrate has been a problem. This is due to the toner used in electrostatic processes which is generally incompatible with the resin coated paper. Thus transfer and adhesion of the toner particles to the resin surface is not satisfactory and compromises the image production.

Thus in electrostatic imaging applications to have the feel and look of a standard silver halide print plain paper can not be used and use of "photographic type" substrates such as polyethylene resin or similar coated substrates are inadequate and pose a problem of softening or melting on the fuser roller. Accordingly, there is a need in the art for a resin coated paper for use in electrostatic applications to overcome these problems.

The invention provides such a solution by coating a coating layer over the resin coated substrate i.e. polyethylene layer. This coating layer typically comprises a natural or synthetic film forming polymer that has a melting point above 140° C., thus preventing the resin coated substrate from melting and sticking to the fuser roller.

This protective layer provides a receiving surface resulting in photorealistic quality prints or copies. Depending on the optional ingredients in the layer a high gloss or semi-matte finish can be created. The invention provides advantage over conventional copying processes as well as over conventional photographic developing processes by providing an environmentally friendly process of producing photorealistic quality prints or copies without using toxic chemicals.

Generally, resin coated papers and adhesive-like gelatin "subbing" layers used for receiving an image are known in photographic applications.

U.S. Pat. Nos. 3,811,913 and 4,188,220 to Kasugai et al. are representative of a "subbing" layer and resin coated paper, respectively, for use in photographic film processing. The '913 patent discloses use of gelatin and other polymeric materials as "subbing" layers for photographic materials including polyethylene coated paper substrates. UV radiation is applied to the coated surface to improve the adhesive property of the polyethylene support to the subbing layer. The '220 patent discloses a polyolefin coated paper. A low molecular weight polyolefin resin is incorporated into a conventional polyolefin resin to provide a coating layer.

U.S. Pat. No. 4,312,937 to Kasper et al. discloses a resin coated paper including a paper layer and first and second layers of polyolefin adhered to opposite sides of the paper layer. Carbon black is incorporated into the polyolefin layers to eliminate pin-holing.

U.S. Pat. No. 4,547,445 to Asahina et al. discloses a photographic material ("postcard") capable of having a photograph on one side and a writing surface of the opposite side. A paper support is coated with a polyolefin resin on both surfaces. A photographic emulsion layer is coated on one surface of the support and the opposite surface is coated with a gelatin layer including an inorganic pigment to absorb inks.

U.S. Pat. No. 5,055,320 to Miura et al. discloses a support sheet including a subbing layer and a photographic emulsion layer. U.S. Pat. No. 5,075,196 to Daems et al. discloses supports for halftone dot image production. Daems provides a process including a paper base support coated on at least one surface with a polyolefin layer. On the exterior of the polyolef in layer is a white pigmented binder layer comprising a hydrophilic colloid binding agent and white titanium dioxide pigment particles. The light sensitive layer is coated on top of this binder layer.

U.S. Pat. No. 5,082,724 to Katsura et al. discloses photographic paper supports consisting of a base paper support coated on both sides with a polyolef in resin.

U.S. Pat. No. 5,104,721 to Sun discloses an electrophotographic imaging media comprised of a polymeric coating on a film substrate (slide projections) to improve printing resolution. The polymeric coating contains at least one pigment and has a Tukon hardness of from about 0.5 to about 5.0 and a glass transition temperature of from about 5 to 45° C.

U.S. Pat. No. 5,141,599 to Jahn et al. discloses a receiving material for ink jet printing including a polyolefin coated base paper with an ink receiving layer applied on the top surface. This receiving layer includes a mixture of gelatin and starch. The receiving material is defined as a gloss surface for ink jet printing comprising a polyolef in coated base paper and an ink receiving layer. The ink receiving layer contains a mixture of gelatin and starch in a ratio of 1:1 to 10:1 with the starch of a specific grain size.

U.S. Pat. No. 5,182,161 to Noda et al., discloses a "support for photosensitive materials" comprising a base paper formed from natural kraft pulp according to a specifically defined digestion and chlorine bleaching process and a resin layer formed on the base paper. A subbing layer comprising a hydrophilic polymer such as gelatin is formed on the resin layer.

In addition the following Japanese patents all relate to papers suitable as "photographic supports" comprising paper coated on at least one side with a polyolefin and with one polyolefin surface over-coated with a hardener-containing gelatin layer. Japanese Patent No. 50-19402 dated Jun. 20, 1973; Japanese Patent No. 50-61154 dated Sep. 28, 1973; Japanese Patent No. 50-66519 dated Oct. 9, 1974; Japanese Patent No. 60-64306 dated Apr. 12, 1985; Japanese Patent No. 61-84643 dated Apr. 30, 1986; Japanese Patent No. 1-137252 dated May 30, 1989; and Japanese Patent No. 2-849 dated Jan. 5, 1990.

It is seen that gelatin over-coated polyethylene coated paper substrates in photographic applications is known. The Japanese patent abstracts describe such papers suitable as photographic supports, however, unlike the invention the gelatin layer is used as an undercoat on which a photographic emulsion coating is applied. This latter emulsion coating described in the prior art is the layer in which the image is formed by processing in an aqueous developing solution. These adhesive-like gelatin "subbing layers" are also described in Kasugai '913; Miura and Noda and also include a photographic emulsion coating thereon. Gelatin layers coated over polyolefin resin coated paper supports are described in Asahina et al. and Daems et al. However the exterior gelatin layer in Asahina includes an inorganic pigment and in Daems includes a white pigmented binder. The gelatin binder layer in Daems is further coated with a "light sensitive" layer.

Kasugai '220 and Kasper are representative of polyolefin coated papers. However, in contrast to the present invention, the resin layer in Kasugai '220 includes a low MW polyolef in resin and in Kasper includes carbon black. Both Katsura et al, and Sun disclose in general only "polyolefin coated" substrates: Kasura defines specific pulp fibers used to produce the base paper which is then coated with polyolefin; and Sun discloses a polymeric (film) substrate coated with polyolefin. Finally, Jahn discloses an ink jet sheet including a receiving layer which is a mixture of gelatin and starch.

The prior art does not teach a coated paper stock for electrostatic imaging. The present invention is directed to the provision of such by providing a substrate coated on at least one surface with a resin layer and a coating layer over the resin layer comprised of one or more natural or synthetic film forming polymers and has a glass transition temperature above 100° C. The particular combination of resin coated paper of the invention provides an electrostatic copy or printing medium that is heat resistant. The coating layer of the invention also provides an image receiving surface layer in which toner particles are transferred and adhered to the surface during electrostatic imaging processes to produce photographic quality prints or copies.

It would be appreciated that advantage over known applications would be obtained by providing a coated paper where the melting point of the resin coating remains greater than 140° C., preferably greater than 200° C., to avoid problems of melting and toner adhesion during electrostatic imaging applications. In addition, this "outer" image layer provides a "hard" surface, which in a preferred embodiment comprises a gelatin and a crosslinking component. This is in contrast to the gelatin layers shown in the prior art which are soft and used as "adhesive" subbing layers. The "hardness" property is desired in the invention since the gelatin layer itself is used as the toner receiving surface layer.

Accordingly, it is a broad object of the invention to provide a coated paper stock for electrostatic imaging comprised of a resin coated substrate with a coating layer.

A more specific object of the invention is to provide a coated paper stock for electrostatic imaging where the "outermost layer" provides heat protection, gloss control, image improvement, improved smoothness, and improved toner adhesion and transport within the electrostatic imaging apparatus.

Another more specific object of the invention is to provide a coated paper stock for electrostatic imaging including a substrate coated on at least one surface with a resin layer comprised of olefinic material and an outer most heat protective layer, where the heat protective layer is a pin-hole free, continuous film over the resin layer.

Another object of the invention is to provide a coated paper stock and related process for producing a 3-dimensional relief image in an electrostatic imaging apparatus.

Another object of the invention is to provide a method for manufacturing a coated paper stock for electrostatic imaging.

A specific object of the invention is to provide a dry method for producing photorealistic quality prints or copies which is advantageous over conventional photographic developing processes by being environmentally friendly and not using toxic chemicals.

A more specific object of the invention is to provide a method for using a coated paper stock in electrostatic imaging applications without the associated problems of melting, image degradation and toner incompatibility.

DISCLOSURE OF INVENTION

In the present invention, these purposes, as well as others which will be apparent, are achieved generally by coating at least one surface of a substrate with a resin layer comprised of olefinic material and a pin-hole free, continuous coating layer over the resin layer. The coating layer has a glass transition temperature above 100° C. and is generally comprised of one or more natural or synthetic film forming polymers.

The coating layer ranges from $0.5\mu$–$30\mu$ in dry thickness, which may be applied in single or multi-layer applications. The preferred thickness is between $2\mu$–$15\mu$. This layer is typically a clear coating but depending on additional components and desired properties may be translucent or opaque. Suitable compounds include crosslinked gelatin or modified gelatin, polyvinyl alcohol (PVA), polyvinyl pyrrolidone (PVP), polyvinyl acetate (PVAC), carboxy methyl cellulose (CMC), hydroxy-ethyl cellulose (HEC), melamine resins, latex, SBR latex or similar compounds.

The coating layer may also contain optional ingredients including pigments, matting agents and fillers. Anti-static agents may also be present in either the protective layer or in the resin layer.

Other objects, features, and advantages of the present invention will become apparent from the following detailed description of the best mode of practicing the invention when considered with reference to the drawings, as follows:

DETAILED DESCRIPTION OF THE PREFERRED EMBODIMENT

Figure 5:
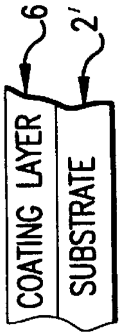
FIG. 5 is a schematic illustration of a coated paper stock of the invention having a 100% synthetic paper substrate with a pin-hole free continuous layer over the substrate.

In accordance with the invention and as shown in FIGS. 1 to 4 coated paper stocks are provided by coating at least one surface of a substrate 2, with a resin layer comprised of olefinic material 4, followed by coating a layer 6, over the resin layer. This coating layer forms a pin-hole free, continuous film over the resin layer. FIG. 5 illustrates an alternate embodiment of the invention where the substrate is not resin coated.

The coated layer 6 is comprised of one or more natural or synthetic film forming polymers and has a glass transition temperature above 100° C. This layer is typically a clear coating but depending on additional components and desired properties may be translucent or opaque.

It is well known in the art that glass transition temperature (Tg) affects such properties as flexibility, water resistance, paper adhesion and setting speed. The glass transition temperature of a polymer is a single average value representing the range in temperature through which the polymer changes from a hard and often brittle material into a soft, rubber-like state. Tg values represent specific polymer composition and as such are relevant in obtaining desired characteristics of water resistance, flexibility, hardness and surface tack in the resulting coatings.

Typically the higher the Tg the harder the resulting coating. Lower Tg polymers are generally soft and sometimes tacky. In addition as Tg values increase, the resulting films are more brittle and inflexible at room temperature. Thus the polymeric materials used in the coated stocks of the invention are chosen to create a layer that has a Tg over 100° C. and that is hard enough to act as a heat protective layer but flexible enough to be used as an image receiving surface for toner particles in electrostatic imaging apparatus.

Generally, the natural polymers included in the coating layer include acid pigskin gelatin, limed bone gelatine, derivatised gelatins such as phthalated, acetylated, carbamoylated. The synthetic polymers of the coating layer include polyvinyllactams, acrylamide polymers, methacrylamide copolymers, maleic anhydride copolymers, polyamides, polyvinyl pyridines, acrylic acid polymers, maleic acid copolymers, vinylamine copolymers, polystyrene, polyurethanes, polyvinylpyrrolidone and polyester.

Preferably, the coating layer is comprised of crosslinked gelatin, modified gelatin, polyvinyl alcohol (PVA), polyvinyl pyrrolidone (PVP), polyvinyl acetate (PVAC), carboxy methyl cellulose (CMC), hydroxy-ethyl cellulose (HEC) , melamine resins, latex, SBR latex or other similar polymeric compounds having high glass transition temperatures preferably greater than 135° C.

The coating layer 6 as illustrated in FIGS. 1 to 3 and 5 is shown to be the “outermost layer”. The coating composition of this layer is selected to result in a “hard” surface to provide a heat protective layer as well as an image receiving layer. In electrostatic imaging apparatus, the coated paper stocks of the invention unexpectedly produced a relief image giving a 3-dimensional appearance. The toner penetrates the hard surface of the coating layer just enough to adhere to the layer but essentially remains on top of the coating layer resulting in a raised surface thus producing a 3-D relief image.

Figure 4:
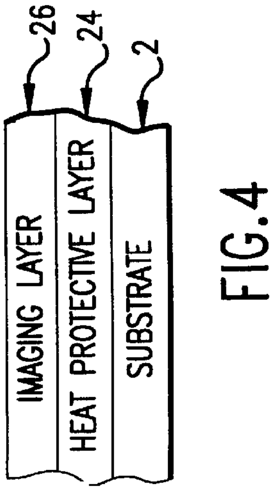
FIG. 4 is a schematic illustration of a coated paper stock of the invention having a paper substrate and two separate coating layers, the inner coating functioning as a heat protective layer and the outer coating functioning as the imaging layer.

In an alternate embodiment, as illustrated in FIG. 4, the substrate 2 is coated with two separate coating layers. The inner coating functioning as a heat protective coating 24 and the outer coating functioning as the imaging layer coating 26. The substrate may also be resin coated prior to the addition of the heat protective coating. The imaging layer 26 may further include an anti-static agent and provides a resistivity to the coating of $10^{10}$ to $10^{12}$ ohms per square. The heat protective layer 24 may further include an anti-static agent and has a resistivity of $10^{6}$ to $10^{9}$ ohms per square.

Crosslinking agents are incorporated into the coating composition depending on the type of polymer used to ensure that the coating layer is a hard surface with a Tg greater than 100° C. Examples of crosslinking agents used in the coating layer include, but are not limited to, formaldehyde, glyoxal, glutaraldehyde, N-methylol compounds, dimethylolurea or methyloldimethylhydantoin, dioxanederivative, 2,3-dihydroxydioxane, activated halogen compounds, 2,4-dichloro-6-hydroxy-s-triazine, epoxides, aziridines, and carbamoyl-pyridinium salts.

The coating layer may further include a surfactant which may be anionic, nonionic or cationic. The surfactant is added for purposes of enhancing the coating quality. In the invention embodiments where multiple coating layers are used surfactants in the coating layers are preferred since their presence provides the proper surface tension to apply the multiple layers. If only a single coating layer is applied over the resin layer, the use of the surfactants is optional. Typically, the surfactant is present in the aqueous heat protective layer in the range of 0–5%.

The coating layer may further include other additional components such as pigments, matting agents and fillers. Specifically, starches, silicas, alumina, zeolite, barium-sulphate, titanium oxide, aluminum silicate, clay, talcum, calcium sulphate, polyacrylate beads and polystyrene beads, polymethyl methacrylate (PMMA) beads, psuedo-boemite, $CaCO_3$, ZnO, aluminum silicates or colloidal silicas.

Anti-static agents are also included in the invention layers. In general in electrostatic imaging applications if no anti-static agent is present the paper sheets exiting the machine will not slide over each other due to static attraction, making them very difficult to separate. Thus it is preferable to use anti-static agents in the invention coated paper stocks. These agents may be added to the resin layer or the heat protective layer depending on the desired conductivity/resistivity of the layers. Representative anti-static agents used in the invention composition are well known for use in photographic elements and are illustrated in *Research Disclosure*, September 1994, pg. 529–530 which is incorporated herein by reference. Antistatic agents preferably used in the composition layers include polystyrene sulfonate (PSS) and sodium nitrate as well as any agent that provides the appropriate resistivity.

Figure 2:
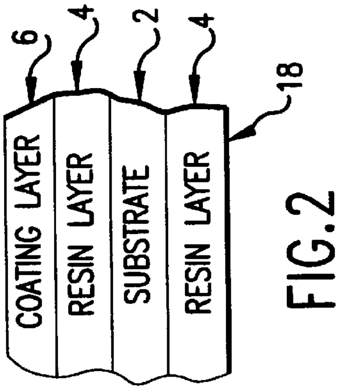
FIG. 2 is a schematic illustration of a coated paper stock of the invention having a paper substrate and two resin layer coatings.
Figure 1:
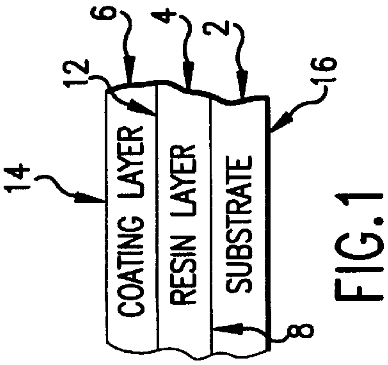
FIG. 1 is a schematic illustration of a coated paper stock of the invention having a paper substrate and including a resin layer and a pin-hole free, continuous layer over the resin layer.

In a preferred embodiment as illustrated in FIG. 2 an anti-static agent is added to the resin layer on the substrate surface opposite the coating layer. In this embodiment the coating layer is the imaging surface layer and the resin coated layer surface 18 is the “backside” or unimaged layer surface. In electrostatic imaging applications, particularly for collating the individual sheets, it is desired that this backside surface be a very conductive layer having a resistivity of $10^6$ to $10^9$ ohms per square. The resistivity values were measured at 30% relative humidity, room temperature 70° F.

In contrast, in the coating layer, or imaging surface layer, a low level of anti-static agent, providing a low conductivity, is preferred. It is desired that only enough electrical charge be present to pick off or transfer the toner particles from the imaging drum to the outermost layer which functions as the imaging layer. Thus an anti-static agent providing a resistivity of $10^{10}$ to $10^{12}$ ohms per square is incorporated into the imaging surface layer.

Figure 3:
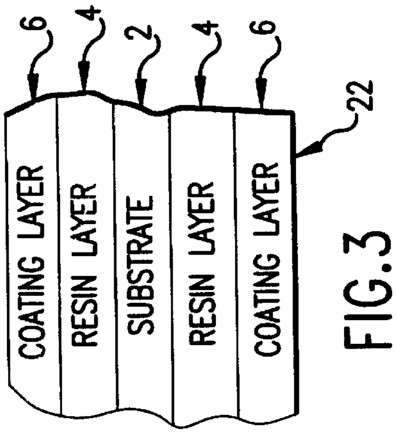
FIG. 3 is a schematic illustration of a coated paper stock of the invention having a paper substrate, two resin layer coatings and two separate coating layers.

FIG. 3 is a most preferred embodiment for electrostatic imaging applications in which both substrate surfaces are each coated with a resin layer 4 and coating layer 6 respectively. This embodiment provides a balanced coated paper stock that substantially prevents curling of the paper after the electrostatic processing. In addition, both outer surface layers 6 provide heat protection as well as being an image receiving surface.

The coating layer may further include electrically charged pigments. In general, the coated paper stock provides heat protection, gloss control, image improvement and smoothness, improved toner adhesion and transport within the electrostatic imaging apparatus. The latter two characteristics are achieved by including electrically charged pigments in the heat protective layer. These colloidal charged pigments which may include silica's and aluminas provide an increased surface area which contribute to the improvement in the transfer and adhesion properties of the coating.

Preferred charged pigments used in the invention are commercially available from EKA Nobel, Inc., Marietta, Ga. Representative pigments are of Nyacol grade and include the following with the particle size of the pigment indicated in parenthesis: 215 (4 nm) ; 830 (10 nm) ; 2050 (20 nm) ; 2040 (20 nm) which are all positively charged pigments; and 1440 (14 nm) which is a negatively charged pigment.

Colloidal-aluminum hydroxychloride (#8676) and colloidal silica (#1115) available from Nalco Chemical Co., Naperville, Ill. are also preferred materials.

The resin coat acts as a barrier on the porous paper substrate. Without the presence of the resin layer the coating layer would penetrate the porous paper substrate and result in inadequate coating of the surface. In addition, the presence of the resin coat enables the adherence of the coating layer to the substrate without substantial penetration.

Another benefit of the resin coated paper is that it improves the optical sharpness of the image relative to uncoated papers and provides a substrate that has the physical characteristics of a photographic print. Furthermore, the resin coated layer is of benefit in reducing the paper response to changes in relative humidity. Typically uncoated papers will be affected by changes in relative humidity causing transport and imaging problems in the electrostatic copy machines.

The resin layer is comprised of olefinic material which is selected from the group consisting of polyethylene, polypropylene, polyester or polyester terephthatale film. Preferably high density polyethylene (HDPE) having a Tg greater than 100° C. is used. Polypropylene having a Tg greater than 140° C. is also a preferred resin material. Low density polyethylene (LDPE) Tg below 100° C. could be used in the invention depending on what the composition and thickness of the heat protective layer is. As long as the Tg of the coating layer is greater than 100° C. and the coating layer is thick enough, preferably between 10–30$\mu$, LDPE may be used. The coated substrates used are similar to those used in developing photographic elements.

The substrate is preferably a cellulosic paper. However, as described in an alternate embodiment, a 100% synthetic paper substrate can be used thus eliminating the separate resin layer. The cellulosic material used as a substrate typically has a basis weight in the range of 60–250 g/m$^2$.

The resin coated paper prior to the application of the coating layer may have either a gloss of matte finish by passing through appropriate chill rolls or other means. However, typically, after coating the heat protective layer and processing through electrostatic application both outer surfaces have a gloss finish of various degrees.

In addition to the coated layers described one or more additional layers may be coated over the heat protective surface depending on the desired properties of the coated paper stock. Where additional layers are included, the outermost layer, is the image receiving layer and must have properties compatible with the transfer and adhesion of toner particles.

Such an additional layer may be comprised of natural or synthetic polymers, low density polyethylene beads, waxes or film forming polymers, wherein said layer has a glass transition temperature below 100° C. For example, a thin layer comprised of a low melting film forming polymer can be coated over the heat protective layer of the invention to improve transfer and adhesion of the toner to the coated paper stock. However, it is noted that the thickness of such a layer is critical since there is a fine balance between sticking and transfer of the toner without melt down and image degradation.

Typically, the coated paper stocks after being processed in electrostatic apparatus have a high gloss finish. However, if a “matte finish” is desired, the outermost layer, may further include “matte” finish type pigments. These matte finish pigments are well known for use in photographic elements and are illustrated in *Research Disclosure*, September 1994, pg. 530 which is incorporated herein by reference.

In an alternate embodiment as illustrated in FIG. 5 a coated paper stock for use in electrostatic imaging is provided comprising a 100% synthetic paper substrate 2' coated on at least one surface with a pin-hole free, continuous coating layer 6 over said substrate. As described earlier the coating layer is comprised of one or more natural or synthetic film forming polymers and has a glass transition temperature above 100° C.

In this embodiment the cellulosic paper substrate and separate resin layer are not present, however, the functional properties and characteristics of these components are provided by the synthetic paper. Typically the synthetic paper is opaque and is comprised of olefinic material selected from the group consisting of polyethylene, polypropylene, polyester, nylon, polyester/rayon, polypropylene/rayon, bicomponent core/sheath fibers or other similar 100% synthetic noncellulosic materials. Other noncellulosic materials may be used as a substrate including polymeric films which may be transparent or opaque.

The coated paper stocks of the invention are made by providing a substrate coated on at least one surface of the substrate with a resin comprised of olefinic material to form a resin layer. The surface of the resin layer is modified to enhance adhesion of the coating layer which is applied as to the resin layer. It is necessary that prior to applying the aqueous coating the resin layer has to be modified to enable adhesion of the applied coating. This modification may be by electrical or chemical means. In the invention it is preferable to corona treat the resin layer to create chemically active sites so that when the aqueous coating is added chemical reactions take place to adhere the resin layer and coating together. Essentially the corona treatment modifies the hydrophobic characteristic of the resin layer to create a hydrophilic surface and also changes the surface tension to allow the aqueous coating solution to be coated thereon.

The aqueous solution is comprised of one or more natural or synthetic film forming polymers and has a glass transition temperature above 100° C. as described earlier herein. The solution is applied by cascade coating, curtain coating, air knife coating or other similar type coating techniques. Upon application to the resin surface the aqueous solution is dried to form a pin-hole free, continuous, layer which heat resistant and is receptive to electrostatic toner particles to produce the coated paper stock of the invention.

The coating layer is typically coated in either single or multiple coatings resulting in 0.5$\mu$ to 30$\mu$ in dry thickness on the resin coated substrate surface. Preferred thickness of the layer is between 2$\mu$–15$\mu$. In electrostatic printing applications the melting point of the heat protective layer must be above 140° C., preferably above 200° C. This is due to the fact that the temperatures of the toner fuser roller of the copier/printer are between 125 to 225° C.

In a preferred embodiment the heat protective layer is comprised of a mixture of gelatin and a crosslinking agent. In preparing the heat protective layer, the aqueous solution is comprised of a gelatin component which is typically present in the range of 2–10%; and a crosslinking agent which is present in the range of 2–16%, preferably between 2–10%.

The invention also provides a dry method for producing photographic quality prints comprised of providing a coated paper stock as defined herein, transferring an image to the outermost coating layer by electrostatic means to produce a print having photorealistic quality. The electrostatic means includes a photocopy machine, a printer or any similar device which transfers an image by electrostatic charges. This process is advantageous over conventional photographic processing which utilizes aqueous developing and fixative solutions that may have harmful environmental impact the entire invention process. In contrast the present invention provides a process for producing said photorealistic quality prints which do not utilize such solutions but rather is a completely dry process.

The invention also includes a method for making a coated paper stock for use in electrostatic imaging applications that is comprised of a resin coated substrate with at least one surface thereof coated with a pin-hole free, continuous, layer having a glass transition temperature above 100° C. This layer is comprised of one or more natural or synthetic film forming polymers and is both heat resistant and is used as an image receiving surface.

The following Examples I to IV below, show various forms of the invention. Specifically, Example I illustrates preparation of the coated paper stocks comprised of a high density polyethylene coated substrate with a coating comprised of a crosslinked gelatin; Example II is similar to Example I except that the formulations include anti-static agents; Example III illustrates the heat sink layer and hardening levels of the invention coatings; Example IV illustrates the effect of varied basis weights of the HDPE substrate; and Example V describes the preparation of the embodiment of the invention illustrated in FIG. 5 where two separate coating layers are provided, the inner coating functioning as a heat protective layer and the outer coating functioning as the imaging layer. These examples are merely representative and are not inclusive of all the possible embodiments of the invention.

The following physical characteristics of the coated paper stocks were measured. As used in this specification and in relation to the Examples these procedures describe the paper test methods and machinery used for each measurement.

Stiffness. Taber Stiffness Tester Model 150-B from Taber Instrument Corp., North Tonawanda, N.Y. Measurements are in arbitrary stiffness units. Desired paper stiffness of the coated paper stocks of the invention are in the range of 30 to 33°.

Burst. Perkins Muller Paper Test (Model L.C.) from B. F. Perkins & Son Inc. Tester Division, Holyoke, Mass. Measurements are in pounds per square inch. The coated paper stocks of the invention are in the range of 70–159 lbs per sq. inch.

Gardner Haze Meter. Micro gloss 85° angle. Reflection units. % incident light reflected back. The coated paper stocks of the invention have a sheen between 20 to 95°.

Caliper. TMI (Testing Machine Inc.), Amityville, Long Island. Measurements are in units of 0 to 1.25 mm. The coated paper stocks of the invention have a caliper in the range of 0.075 to 0.75 mm.

Tint L,a,b. Lab Scan (Hunter lab) LS 5100 Spectrocolormeter. Measures color and brightness (A) measures image and background whiteness of paper (B).

(A)

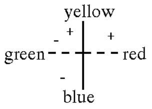

(B)

| GELATIN KETTLE | | | CROSSLINKING KETTLE | | |
|---|---|---|---|---|---|
| SOLUTION 1 | | | SOLUTION 2 | | |
| GELATIN* | 1 | KG | | | |
| DEIONIZED WATER | 15.5 | L | DEIONIZED WATER | 16.943 | L |
| | | | CROSSLINKING AGENT+ | 9 | L |
| ANIONIC SURFACTANT** | 30 | ml | | | |
| NONIONIC SURFACTANT++ | 60 | ml | | | |
| MELT TEMP. | 55° C. | | | | |
| FINAL TEMP. | 40° C. | | FINAL TEMP. | 23° C. (ROOM TEMP.) | |
| COAT TEMP. | 40° C. | | COAT TEMP. | 40° C. | |

*Limed Bone gelatin available from Rousselot, France
**Anionic surfactant - NIAPROOF ™ available from Niacet Corp.
++Nonionic surfactant - Olin Surfactant 10G available from Olin Chemical
+5% formaldehyde in water solution The heat protective layer was prepared by mixing two solutions: Solution 1 containing the gelatin and anionic surfactants; and Solution 2 containing the crosslinking agent. The anionic surfactants are present in Solution 1 to permit coating the solution on the paper substrate. To prepare Solution 1 the gelatin and deionized water were combined and allowed to soak and swell. Then the gelatin was melted at 55° C. and coated at 40° C. The crosslinking agent in Solution #2 is a 5% solution of formaldehyde. The final temperature of Solution 2 is 23° C. (room temperature) and the coating temperature is 40° C.

The melted solutions were then coated on a polyethylene resin coated paper by means of a cascade coating head. The two Solutions 1 and 2 were premixed during the coating operation by adding the crosslinking agent (Solution 2) via a side stream addition followed by a static mixing unit. The mixed solutions were coated on a moving web with high density polyethylene (HDPE) resin coated paper at a set flow rate of 0.612 L per min. for Solution 1 and 0.170 L per min. for Solution 2, web rate was 300 feet per min. and web width was 14 inches. The coating temperature for both solutions were 40° C.

The gelatin crosslinking agent is present in the range of 30–500 mg per gram of gelatin. The crosslinking agent (Sol. 2) reacts with the gelatin (Sol. 1) to form a 3-dimensional matrix structure without individual polymeric chains. This resulting structure has a high melting temperature of over 200° C.

The coated material was allowed to age at ambient conditions for one week to allow the cross linking of the gelatin with formaldehyde to take place. The aged coating was then tested as a receiver sheet on an Eastman Kodak Monochrome Electrostatic Copier #85. The fuser roller temperature at the time of testing was 125 to 145° C. A copy was made using the test material as the copy media. A good crisp copy was made and no jam was noted. The process of making a copy was repeated with the side of the test sheet having no gelatin protection over the polyethylene layer. This side stuck to the fuser roller creating a jam.

The same material was tested with a Ricoh Preter 5006 Color Copier/Printer. The results were similar to those obtained on the Kodak machine. The same sheets were also run through a Canon CL 200 color copier and a Xerox "Majestik" printer/copier unit with similar results to those obtained on the Kodak machine.

In a control, experiment, the paper stock was coated on one side with HDPE and on the opposite side LDPE. The HDPE side was further coated with a heat protective layer comprised of crosslinked gelatin. The sheet was passed through the Kodak machine. The gelatin coated side showed good image quality and no melting or softening on the fuser roller. However the uncoated LDPE side showed blistering (melting).

EXAMPLE II

Essentially the same Solutions 1 and 2 were prepared as in Example I above except that anti-static agents were added to Solution #2. Specifically 800 ml of polystyrene sulfonate (50% in water), and 640 ml of sodium nitrate (50% in water) were added.

These sheets were tested as in Example I, except that in Example I the coated paper stocks were feed into the machine individually, in this Example the paper stock was placed in the paper trays of the copy machine. The sheets in this example were imaged and exited the machine without sticking to the fuser roller. In addition, the black density of the coated paper stocks prepared in this example increased by 10% compared to Example I in which no anti-static agent was present. Thus it appears that the presence of the anti-static agent in the heat protective or image receiving surface layer increases the amount of toner transferred to the coated paper.

EXAMPLE III

The same Solutions #1 and #2 were prepared as in Example I above and coated using cascade coating side-stream mixing of the crosslinking agent on a substrate coated on both sides with high density polyethylene (HDPE). Heat protective layer thickness and hardening level were tested in the samples 1 to 2 described in the table below. Aqueous solutions were coated to the base substrate and dried. The dried layer thickness was measured. The last column indicates the amount of crosslinking agent, in grams, per gram of gelatin, used in the protective coating layer.

The coated paper samples were tested as receiver sheets on an Eastman monochrome copy machine (EK 85). The coatings in samples 1 and 2 showed blistering, samples 3 to 6 did not. These results illustrate that both layer thickness and crosslinking level play a role in heat protection of the polyethylene coated substrate.

| SAMPLE | SOLUTION 1 | SOLUTION 2 | HEAT PROTECTIVE LAYER THICKNESS | HARDENER TO GELATIN |
|---|---|---|---|---|
| 1 | 612 ml | 170 ml | 1.0 μ | 0.08 g/g gel |
| 2 | 612 ml | 250 ml | 1.0 μ | 0.12 g/g gel |
| 3 | 612 ml | 350 ml | 1.0 μ | 0.16 g/g gel |
| 4 | 1200 ml | 340 ml | 2.0 μ | 0.08 g/g gel |
| 5 | 1200 ml | 510 ml | 2.0 μ | 0.12 g/g gel |
| 6 | 1200 ml | 680 ml | 2.0 μ | 0.16 g/g gel |

EXAMPLE IV

The coating formulations in Sample 6 of Example III were used in this example (2μ layer thickness and 0.16 g/g gel). Samples 1 to 3 below were prepared by coating this formulation on HDPE base paper of varied basis weights.

| SAMPLE | PAPER BASIS WEIGHT (TOTAL) |
|---|---|
| 1 | 250 $g/m^2$ |
| 2 | 180 $g/m^2$ |
| 3 | 136 $g/m^2$ |

The coated papers were tested as receiver sheets in a Xerox "Majestik" printer copier. Test data indicated no blistering when contacting the fuse roller in samples 1 to 3, with varied basis weights. However, color toner adhesion appears to be related to paper weight. The thicker the paper, sample 1, the poorer the adhesion of the toner. This is believed to be related to improved heat dissipation of thicker paper thus removing fuser roller heat more quickly.

| UNDERLAYER | | | SURFACE LAYER | | |
|---|---|---|---|---|---|
| SOLUTION 1 | | | SOLUTION 2 | | |
| GELATIN* | 1 | KG | GELATIN* | 1 | KG |
| DEIONIZED WATER | 15.5 | L | DEIONIZED WATER | 15.5 | L |
| | | | MATTE+ | 300 | gm |
| ANIONIC SURFACTANT** | 5 | ml | ANIONIC SURFACTANT** | 30 | ml |
| NONIONIC SURFACTANT++ | 5 | ml | NONIONIC SURFACTANT++ | 60 | ml |
| MELT TEMP. | 55° C. | | MELT TEMP. | 55° C. | |
| FINAL TEMP. | 40° C. | | FINAL TEMP. | 23° C. (ROOM TEMP.) | |
| COAT TEMP. | 40° C. | | COAT TEMP. | 40° C. | |

*Limed Bone gelatin available from Rousselot, France
**Anionic surfactant - NIAPROOF ™ available from Niacet Corp.
++Nonionic surfactant - Olin Surfactant 10G available from Olin Chemical.
+10% wax dispersion of Shamrock S-379N and Shamrock S-232NI (1:1 ratio). Waxes are available from Shamrock, Newark, New Jersey.

| CROSSLINKING AGENT | | |
|---|---|---|
| SOLUTION 3 | | |
| DEIONIZED WATER | 16.943 | L |
| CROSSLINKING AGENT+ | 9 | L |
| ANTISTAT #1+++ | | |
| ANTISTAT #2*** | | |
| FINAL TEMP. | 23° C. (ROOM TEMP.) | |
| COAT TEMP. | 40° C. | |

+5% formaldehyde in water solution
+++Polystyrene Sulfonate (PSS) 50% - available from National Starch
***Sodium Nitrate 50% in water - available from Aldrich Chemical The procedure followed in the example is similar to that described in Example I. The invention layers were prepared by swelling and melting the gelatin in Solution #1 and Solution #2 in deionized water. The additional ingredients were mixed into the solutions in the order indicated in the tables above. Gelatin swelling, melting and finalling was done at 23° C., 55° C. and 40° C., respectively. The crosslinking agent, Solution #3, was prepared at 23° C.

Each of the melted solutions were coated on polypropylene resin coated paper by means of a two-slot cascade coating head. Solution #1 was coated out of the first slot at a dry coverage of 2$\mu$ and Solution #2 was coated out of the second slot at a dry coverage of 1$\mu$. In Solution #3, the crosslinking agent and antistat is added at the time of coating via sidestream addition to Solutions #1 and #2. The crosslinking addition rate is equal to 100 mg of formaldehyde per gram of gelatin.

The solutions are coated on a moving web of polypropylene resin coated paper. The web rate was 250 feet per minute at a width of 14 inches. Solution #1 flow was 1.0 liter per minute. Solution #2 was 0.5 liters per minute. Solution #3 was sidestream mixed into Solution #1 at 0.567 liters per minute and Solution #2 at 0.283 liters per minute. The front and backside of the polypropylene resin coated paper was coated with identical solution coverage. The coated material was allowed to age for one week to assure crosslinking of the formaldehyde and gelatin took place.

The coating was then tested as the color copy receiver sheet on a Xerox Majestik (Model 5765). The fuser roller temperature at the time of imaging was 185° C. A good crisp copy was made and no paper jams were noted. Toner adhesion was very good.

The material was also tested using a Ricoh NC 5006 Color Laser Copier/Printer. No blistering was noted, a good crisp color copy was made. No jams or melting were noted. The fuser roller on the Ricoh unit has a temperature of 160–175° C. at the time the receiver sheet was imaged.

The present invention provides advantages over prior practice that include use of polyethylene resin coated papers for receiver sheet in copiers and printers having toner fuser rollers without the problems of softening or melting in electrostatic and laser imaging applications. The invention allows the control of the sheen levels of the resulting paper. The coated paper stocks provide prints with photographic feel and quality not previously possible.

It will be recognized by those skilled in the art that the paper stocks of the invention and process have wide application in electrostatic imaging applications to produce photographic quality prints and copies.

Advantageously, the paper stocks of the invention provide gloss control, improved toner adhesion and improved transport with the electrostatic imaging system. Also, the paper stocks of the invention provide an instant imaging system that utilizes a completely dry process for producing prints and copies. Unexpectedly, this process also produces a relief image with a 3-dimensional appearance.

Finally, variations of the coated paper stocks from the examples given herein are possible in view of the above disclosure. Therefore, although the invention has been described with reference to certain preferred embodiments, it will be appreciated that other composite structures and processes for their fabrication may be devised, which are nevertheless within the scope and spirit of the invention as defined in the claims appended hereto.

I claim:

1. A coated paper or film stock for electrostatic imaging comprising:

a substrate coated on at least one surface with a resin layer comprised of olefinic or polyester material; and a pin-hole free, continuous coating layer over said resin layer;

wherein said coating layer has a glass transition temperature above 100° C. and is comprised of one or more natural or synthetic film forming polymers and an anti-static agent which provides a resistivity to the coating of $10^{10}$ to $10^{12}$ ohms per square.

2. A coated paper or film stock as defined in claim 1, wherein said natural film forming polymers are selected from the group consisting of acid pigskin gelatin, limed bone gelatine, derivatised gelatins, phthalated gelatins, acetylated gelatins and carbamoylated gelatins.

3. A coated paper or film stock as defined in claim 1, wherein said synthetic film forming polymers are selected from the group consisting of polyvinyllactams, acrylamide polymers, methacrylamide copolymers, maleic anhydride copolymers, polyamides, polyvinyl pyridines, acrylic acid polymers, maleic acid copolymers, vinylamine copolymers, polystyrene, polyurethanes, polyvinylpyrrolidone and polyester.

4. A coated paper or film stock as defined in claim 1, wherein said coating layer is comprised of crosslinked gelatin, derivatised gelatin, polyvinyl alcohol (PVA), polyvinyl pyrrolidone (PVP), polyvinyl acetate (PVAC), carboxy methyl cellulose (CMC), hydroxy-ethyl cellulose (HEC), melamine resins, latex or styrene-butadiene rubber (SBR) latex.

5. A coated paper or film stock as defined in claim 1, wherein said coating layer is comprised of a mixture of gelatin and a crosslinking agent.

6. A coated paper or film stock as defined in claim 2, wherein said coating layer contains at least 60 wt. % gelatin.

7. A coated paper or film stock as defined in claim 5, wherein said coating layer further comprises a surfactant present up to 5% by volume.

8. A coated paper or film stock as defined in claim 1, wherein said coating layer further comprises pigments, matting agents and fillers.

9. A coated paper or film stock as defined in claim 8, wherein said pigments, matting agents and fillers are selected from the group consisting of starches, silicas, alumina, zeolite, barium-sulphate, titanium oxide, aluminum silicate, clay, talcum, calcium sulphate, polyacrylate beads and polystyrene beads, polymethyl methacrylate (PMMA) beads, psuedo-boemite, $CaCO_3$, ZnO, aluminum silicates and colloidal silicas, and mixtures thereof.

10. A coated paper or film stock as defined in claim 1, wherein said coating layer is both an image receiving layer and a heat protective layer.

11. A coated paper or film stock as defined in claim 1, wherein said coating layer further includes electrically charged pigments.

12. A coated paper or film stock as defined in claim 1, wherein said coating layer further includes pigments which provide a matte finish.

13. A coated paper or film stock as defined in claim 1, wherein said coating layer is $0.5\mu$ to $30\mu$ in dry thickness.

14. A coated paper or film stock as defined in claim 1, wherein said olefinic or polyester material is selected from the group consisting of polyethylene, polypropylene, polyester or polyester terephthalate film.

15. A coated paper or film stock as defined in claim 1, wherein said resin layer further includes an anti-static agent.

16. A coated paper or film stock as defined in claim 1, wherein said substrate is cellulosic material and has a basis weight in the range of 60–250 $g/m^2$.

17. A coated paper or film stock as defined in claim 1, wherein the uncoated substrate surface is coated on with a second resin layer.

18. A coated paper or film stock as defined in claim 17, wherein said second resin layer further includes an antistatic agent and has a resistivity of $10^6$ to $10^9$ ohms per square.

19. A coated paper or film stock as defined in claim 17, wherein said coating layer is coated over said second resin layer.

20. A coated paper or film stock as defined in claim 1, further comprising an inner coating layer over said resin layer wherein said inner layer is a heat protective layer.

21. A coated paper or film stock as defined in claim 1, including at least one additional coating layer over said coating layer; wherein said additional coating layer is comprised of natural or synthetic polymers, low density polyethylene, waxes or film forming polymers and has a glass transition temperature below 100° C.

22. A coated paper or film stock for use in electrostatic imaging comprising:

a substrate coated on a surface thereof with an inner and outer coating layer;

wherein said inner coating layer is a heat protective layer coated on the surface of said substrate and is comprised of one or more natural or synthetic film forming polymers; and said outer coating layer is an image receiving layer coated over the surface of said inner coating layer and is comprised of one or more natural or synthetic film forming polymers and an anti-static agent which provides a resistivity to the coating of $10^{10}$ to $10^{12}$ ohms per square.

23. A coated paper or film stock as defined in claim 22, wherein said substrate is selected from the group consisting of cellulosic paper or paperboard; synthetic paper or paperboard comprised of polyethylene, polypropylene, polyester, nylon, polyester/rayon, propylene/rayon or bicomponent core/sheath materials and transparent film.

24. A coated paper or film stock as defined in claim 22, wherein said substrate is coated with a resin layer prior to coating with said inner layer.

25. A coated paper or film stock as defined in claim 1, wherein said substrate is selected from the group consisting of cellulosic paper or paperboard; synthetic paper or paperboard comprised of polyethylene, polypropylene, polyester, nylon, polyester/rayon, polypropylene/rayon or bicomponent core/sheath materials and transparent film.

26. A coated paper or film stock comprising:

a substrate coated on both surfaces with a resin layer comprised of olefinic or polyester material; and a pin-hole free, continuous coating layer over at least one of said resin layers;

wherein said coating layer has a glass transition temperature above 100° C. as is comprised of one or more natural or synthetic film forming polymers and an anti-static agent which provides a resistivity to the coating of $10^{10}$ to $10^{12}$ ohms per square.

27. A coated paper or film stock as defined in claim 26, wherein said resin layer, which has not been coated with said coating layer, further includes an anti-static agent and has a resistivity of $10^6$ to $10^9$ ohms per square.

* * * * *